United States Patent
Bagala et al.

(10) Patent No.: US 6,524,661 B2
(45) Date of Patent: Feb. 25, 2003

(54) METHOD OF ELECTROSTATICALLY COATING A SUBSTRATE

(75) Inventors: Joseph Michael Bagala, Hopewell Jct., NY (US); Kurt Norman Beale, Poughkeepsie, NY (US)

(73) Assignee: Engelhard Corporation, NJ (US)

( * ) Notice: Subject to any disclaimer, the term of this patent is extended or adjusted under 35 U.S.C. 154(b) by 0 days.

(21) Appl. No.: 09/974,144

(22) Filed: Oct. 10, 2001

(65) Prior Publication Data

US 2002/0034591 A1 Mar. 21, 2002

Related U.S. Application Data

(62) Division of application No. 09/598,666, filed on Jun. 20, 2000, now Pat. No. 6,325,846.

(51) Int. Cl.$^7$ .................................. B05D 1/04
(52) U.S. Cl. .................. 427/475; 427/485; 427/486
(58) Field of Search .................. 427/459, 469, 427/475–481, 485, 486, 214, 215, 218–220

(56) References Cited

U.S. PATENT DOCUMENTS

| 4,544,415 | A | * | 10/1985 | Franz et al. |
| 5,091,011 | A | | 2/1992 | DeLuca, Jr. |
| 5,187,220 | A | | 2/1993 | Richart et al. |
| 5,332,767 | A | * | 7/1994 | Reisser et al. |
| 5,423,912 | A | | 6/1995 | Sullivan et al. |
| 5,759,255 | A | | 6/1998 | Venturini et al. |
| 5,824,144 | A | | 10/1998 | He et al. |
| 5,827,361 | A | | 10/1998 | Bernhardt et al. |
| 5,898,043 | A | | 4/1999 | Uemae et al. |
| 6,245,323 | B1 | | 6/2001 | Christie et al. |

FOREIGN PATENT DOCUMENTS

| EP | 0755 986 A2 | 1/1997 |
| WO | WO 96/32446 | 10/1996 |

* cited by examiner

*Primary Examiner*—Fred J. Parker

(57) ABSTRACT

A laminar pigment which has an aluminum- or an aluminum-cerium oxide coating combined with a hydrolyzed silane coupling agent treated surface is used as a pigment for a powder coating composition. By combining the pigment with a powdery film-forming polymer, a film-forming composition which can be applied by electrostatic coating is produced.

9 Claims, No Drawings

METHOD OF ELECTROSTATICALLY COATING A SUBSTRATE

CROSS REFERENCE TO RELATED APPLICATION

This is a divisional of U.S. patent application Ser. No. 09/598,666, filed Jun. 20, 2000, now U.S. Pat. No. 6,325,846 in the name of Joseph M. BAGALA and Kurt Norman BEALE and entitled "POWDER COATING METHOD AND COMPOSITION".

BACKGROUND OF THE INVENTION

The electrostatic coating process for the application of color coatings on various substrates is well known. The composition which is utilized in this process is an electrically chargeable powder mixture of a film-forming polymer and a pigment (or pigments) having the desired color. Unfortunately, preparation of such powder coating compositions for application by a powder spray applicator has presented a problem in the past in connection with platy pigments.

Platy pigments of a metallic material rely on their laminar structure for maximum appearance effect. Such plates include, for instance, metallic flakes such as aluminum, bronze and stainless steel plates as well as natural or synthetic pearlescent pigments exemplified by, e.g., natural pearlescence or a metal oxide-coated substrate such as titanium dioxide-coated mica, iron oxide-coated mica, titanium dioxide-coated glass, iron oxide-coated glass and iron-coated aluminum flakes. The laminar structure of such metallic or pearlescent pigments is destroyed during the extrusion or grinding processes which are used in the manufacture of powder coating compositions and as a result, the coating appearance achieved exhibits a reduced luster effect.

The industry has attempted to avoid the foregoing problem by dry blending the pigments and polymer powder, i.e., the polymer carrier is mechanically blended with the pigment. Unfortunately, the pigment and the powder particles usually develop a different charge magnitude which results in a color shift when the powder coating composition is electrostatically sprayed on a substrate. In addition, the pigments tend to separate from the powder in that volume of the powder spray composition which does not attach to the substrate and is then recovered, which makes that recovered material difficult to reuse.

To overcome the problems encountered as a result of the dry blending process, a blending process in which the powder base and the pigment were mixed and then heated to a temperature sufficient to soften the surface of the powder particles so that the pigment could bind to the surface of such particles was developed, as described in U.S. Pat. No. 5,187,220. While this process works well for corona electrostatic charging and alleviates the problems with reusing the powder overspray, it also leaves two distinctly different surfaces in the final mixture. The procedure also does not work well for tribo electrostatic charging.

A significant advance in the art is described in U.S. Pat. No. 5,824,144, the disclosure of which is hereby incorporated by reference. As there described, the metal containing platelet pigment is provided with a viscous surface layer of polymer or other sticky liquid material. When that treated pigment is blended with powder coating composition, the powder attaches to the surface of the pigment thereby minimizing color separation. The pigment is also encapsulated by the powder to thereby present a single surface. A better charge of those pigment particles which do not become attached to the powder materials is also realized.

A significant problem in connection with the use of metal-containing platelet pigments in a powder coating composition is that the concentration of the pigment which can be incorporated is limited. While pigment amounts of up to about 10% or more can be utilized in single application environments or in the laboratory, the concentration is limited to about 3% when operating on a larger scale as is required commercially. At levels higher than about 3%, numerous problems arise. These include spray gun clogging, blotchy panel appearance and color separation.

It has now been discovered that a treatment which had previously been developed for pearlescent pigments intended for exterior use to provide improved humidity, resistance and overall weatherability and which was used in liquid coating systems such as a solvent or water borne automotive paint systems, for example, pigmented base coat and clear top coat, provides superior properties in the context of powder coatings. The exterior pigment treatment surprisingly improves the application properties of the pigment when incorporated into powder coatings. Such improvements include less build up of the pigment at the electrostatic gun tip, improved transfer through feed lines, improved transfer efficiency of the pigment and a more uniform coating appearance.

SUMMARY OF THE INVENTION

The present invention relates to an improved pearlescent pigment powder coating composition and powder coating method. More particularly, the invention relates to a powder coating composition comprising a mixture of a particulate resin carrier and a particulate pigment in which the pigment is a laminar metal-containing pigment having a first coating of a hydrated aluminum oxide or hydrated cerium and aluminum oxides and a coating of a hydrolyzed silane coupling agent on or intermingled with the first coating. Use of this powder coating composition provides an improved powder coating application method.

DESCRIPTION OF THE INVENTION

The powder coating composition of the present invention is the conventional powder coating composition for electrostatic application as a result of dry blending in which the pigment has been treated as described below. Thus any known particulate resin carrier used heretofore can also be used in the composition and process of the present invention. As a result of the improved pigment utilized in the present invention, the pigment concentration can be typically up to about 8% of the total powder. Typically, depending on the effect desired, the pigment will constitute about 1 to 8% of the composition.

The pigment of the present invention is laminar, that is, it is a platelet-like pigment. The platelets can be made of a reflective metal such as aluminum, bronze or stainless steel in the form of flakes or also can be any natural or synthetic pearlescent pigment. Natural pearlescent pigments include natural pearlescence and the synthetic pigments include metal oxide-coated mica pigments, metal oxide-coated glass flakes, iron-coated aluminum flakes and reduced titanium-coated micas. On a commercial basis, the titanium dioxide and iron oxide micas are encountered most often. Nevertheless, any laminar pigment can be treated in accordance with the present invention.

Coating of a metal oxide-coated mica pigment with a hydrous aluminum oxide per se is known. It is described, for example, in U.S. Pat. No. 5,091,011, the disclosure of which is incorporated herein by reference. Briefly, the pigment is dispersed by stirring in water and then an aluminum compound such as aluminum chloride, aluminum sulfate or aluminum potassium sulfate, and a neutralizing agent such as sodium hydroxide, potassium hydroxide ammonia or urea, are added simultaneously as aqueous solutions. The resulting hydrolysis causes the hydrous oxide to deposit on the substrate. As described, the aluminum compound must be added slowly enough to permit the formation of a smooth, continuous layer on the platelets and the rate should fall within the range of about 0.03 to 0.1 mg Al per minute per gram of pigment, preferably about 0.005 to 0.07 mg Al/min/g pigment. A quantity of aluminum compound solution is used so as to produce a hydrous aluminum oxide coating containing about 0.05 to 1.2% aluminum, preferably about 0.1 to 0.8% aluminum, based on the total weight of the pigment. Pigments in which the concentration of aluminum is about 1.2% are less effective in stabilization than lower concentrations. After deposition of the coating, the product can be filtered, washed with water and dried at any convenient temperature. Use of a temperature which is high enough to calcine the hydrous aluminum oxide should be avoided.

The coating of the pigments with a coating consisting essentially of a combination of hydrated cerium and aluminum oxides is also per se known. It is described, for instance, in U.S. Pat. No. 5,423,912, the disclosure of which is incorporated herein by reference. Briefly, the pigment is dispersed in a liquid from which the cerium and aluminum can be readily precipitated onto the surface of the pigment. This conveniently, and preferably, is an aqueous dispersion. The solid pigment in the dispersion generally comprises about 5 to 30%, preferably about 10 to 20%, and the cerium and aluminum are each added to the dispersion in the form of a salt which is soluble in a liquid medium. While other salts can be used, the nitrate salts are preferred. It is also preferred to deposit about 0.1–1.5% cerium hydroxide, more preferably 0.2–0.6%, calculated as weight percent cerium and about 0.1–1%, more preferably 0.2–0.6%, aluminum hydroxide, calculated as weight percent aluminum, based on the weight of the pigment. The salts can be added to the slurry individually in either order and precipitated or preferably, added simultaneously and precipitated. Precipitation is controlled by raising the pH to a value greater than about 5, preferably to a value of about 5.5–7.5. After completion of the precipitation step, the treated product is separated from the dispersion by any convenient means such as, for instance, filtration, centrifugation or settling, washed and dried.

The aluminum- or aluminum-cerium-treated pigment of this invention is additionally treated with a hydrolyzed silane coupling agent or a mixture of such agents. These, as known, are compounds which act as an interface between an organic material and an inorganic material to enhance the affinity between the two. Thus, the silane coupling agents generally have both an organo functional group and a silicon functional group bonded either directly or indirectly to silicon. The silicon functional groups are generally alkoxy groups and preferably $C_{1-4}$ alkoxy groups.

Examples of silane coupling agents which can be used in the present invention are gamma-(2-aminoethyl) aminopropyltrimethoxysilane, aminopropyl trimethoxysilane, gamma-aminopropyltriethoxysilane, gamma-(2-aminoethyl) aminopropylmethyldimethoxysilane, gamma-methacyryloxypropylmethyltrimethoxysilane, gamma-metacyryloxypropyltrimethoxysilane, gamma-glycidoxypropyl trimethoxysilane, gamma-mercaptopropyltrimethoxysilane, vinyltriacetoxysilane, gamma-chloropropyltrimethoxy silane, vinyltrimethoxysilane, trimethylchlorosilane, gamma-isocyanatopropyltriethoxysilane and the like.

The silane coupling agent should be selected so that it is suitable for any organic material which will be combined with the pigment in use.

The pigment is treated with the silane coupling agent by dry or wet mixing.

For instance, an aqueous solution of the agent in water or a mixture of water and an organic solvent can be added to an aqueous slurry of the pigment. The silane is preferably prehydrolyzed such as, for instance, by stirring the coupling agent in water for a suitable period of time. It is also possible to effect hydrolyzation at the time of mixing. In general, about 0.1 to 10 wt %, preferably about 0.25 to 5 wt %, of the silane coupling agent is used based on 100 parts by weight of pigment being treated. The coupling agent and pigment are combined for a period of time sufficient to allow reaction to occur, which may last from a few minutes to several hours or more, preferably about 3 to 24 hours. Thereafter the treated pigment can be recovered in the conventional fashion such as by filtration, centrifugation and the like, and dried. It is also possible to combine, if desired, the coupling agent treatment with the aluminum/cerium treatment.

In order to further illustrate the present invention, various non-limiting examples are set forth below. In these examples, as throughout the specification and claims, all parts and percentages are by weight and all temperatures in ° C., unless otherwise indicated.

Example 1

A blue-reflecting $TiO_2$-coated mica pigment containing 53% $TiO_2$ and 1% $SnO_2$, with platelets primarily 5 to 50 μm in length, was used as the substrate. Aliquots of the pigment (250 g) were dispersed in 3 liters of distilled water and heated with stirring at 60° C. The pH was adjusted to 5.5 with hydrochloric acid and then a solution of 2.91% $AlCl_3.6H_2O$ (3.3 mg Al/ml) was added at a rate of 4 ml/min for 57 minutes. Simultaneously, a 3.5% caustic solution was added so as to maintain the pH at 5.5. After stirring for 15 minutes, the product was filtered, washed with distilled water and dried at 110° C. The hydrous aluminum oxide contained 0.3% aluminum based on the total weight of the treated pigment.

A charge of 400 g of the aluminum surface treated titanium dioxide-coated mica was placed in a V-shaped tumble blender equipped with an intensifier bar. A hydrolyzed silane coupling agent had been prepared by stirring 10 g of gamma-glycidoxypropyltrimethoxysilane and 22 g of deionized water for 1 hour. The hydrolyzed silane is in an amount of 2.44 g was atomized onto the pigment as it was being tumbled in the blender and intensely mixed for about 20 minutes in order to evenly distribute the silane on the pigment. Thereafter the combination was allowed to stand for two hours in order to permit the reaction between the coupling agent and the pigment to reach completion.

Example 2

The procedure of Example 1 was followed except that the pigment was a red-reflecting ferric oxide-coated mica (40% $Fe_2O_3$) containing platelets primarily 5 to 40 μm in length. The aluminum chloride solution was added for 114 minutes and the product, after filtering, washing and drying, contained a hydrous oxide having 0.6% aluminum.

Example 3

A 2% solution of (3-glycidoxypropyl)trimethoxy silane in water, adjusted to a pH of 4 with acetic acid, was allowed to stir for 60 minutes. Enough aluminum treated titanium dioxide-coated mica of Example 1 was added to the solution to obtain a slurry concentration of 20%, all the while stirring the slurry. After about 2.5 hours, the pigment was recovered from the aqueous slurry by filtration and dried at about 80° C., for 16 hours.

Example 4

The procedure of Example 3 was repeated except that the silane employed was β-(3,4-epoxycyclohexyl) ethyltrimethoxysilane.

Example 5

The procedure of Example 3 was repeated except that the silane was gamma-methacryloxypropyltrimethoxysilane.

Example 6

The procedure of Example 3 was repeated except that the silane was a mixture of gamma-glycidyloxypropyl trimethoxysilane and octyltriethoxysilane.

Example 7

Eight parts of a titanium dioxide-coated mica pearlescent pigment which have been treated with cerium hydroxide and silane following the procedure of Example 1 and having a pearl appearance was dry blended with 100 parts of a black polyester powder (RAL9005 supplied by H. B. Fuller under the commercial code P3M5855). The polyester powder and pigment were mixed and shaken for 5 minutes, sifted first through a 30 mesh screen and then through a 60 mesh screen and the collected material was shaken for an additional 5 minutes. The blend was then electrostatically applied to aluminum panels using a corona spray gun and the panels were cured for 10 minutes in an electric oven. The resultant panels presented a smooth, uniform appearance and build up on the spray gun nozzle tip was not apparent.

For comparison purposes, the foregoing procedure was repeated except that the pigment was a pearl appearing chrome treated exterior grade pearlescent pigment which was commercially available. There was considerably more pigment build up on the spray gun tip in this instance and the coating obtained was less uniform in appearance and darker in color, which indicated that a lower percentage of the pigment was present on the panel.

Example 8

In another experiment designed to measure the transfer efficiency, the treatments described in Example 7 were repeated. Before the coated panels were baked, the coating powder was scraped off the panels and analyzed to determine the transfer efficiency and the mean diameter of the particles before and after spraying. The amount of pigment in the samples was determined by ashing the samples and quantitatively weighing the residue. If all of the pigment had been transferred to the panel, the amount of pigment in the ash would be the same as the amount in the dry coating mixture.

The results are set forth in the following table in which "Base" refers to the RAL9005 without any pigment, "Ce/Si" refers to the dry blend powder using the pigment of the invention, "Cr Dry Blend" refers to the dry blend powder using the comparative chromium treated pigment and "Cr Bonded" refers to the product of the blending process the powder base and pigment, and heating to the softening point resulting in the bonding of the pigment to the powder surface as described in the aforementioned U.S. Patent No. 5,187,220 applied to the chromium treated pigment.

TABLE 1

| Composition | % Pigment in Ash | | | Mean Particle Size ($\mu$) | |
|---|---|---|---|---|---|
| | Before Spray | After Spray | Transfer Efficiency | Before Spray | After Spray |
| Base | — | — | — | 42.3 | 44.1 |
| Ce/Si | 4.88 | 4.39 | 90 | 29.4 | 28.9 |
| Cr Dry Blend | 4.02 | 2.72 | 68 | 26.6 | 30.7 |
| Cr Bonded | 3.83 | 3.29 | 86 | 26.6 | 30.2 |

Example 9

Example 7 was repeated except that the powder and pigment were mixed and then only shaken for 5 minutes prior to spraying. The use of the pearlescent pigment of the invention appeared to impart a fluidity to the finished powder which aided in the fluidization in the hopper and transfer tubes of the coating equipment. The powder was observed to flow freely without leaving residual material collecting in the transfer tube. During spraying, the pigment did not appear to separate from the powder and there was no residual pearl pigment on the deflector. Using other pearl pigments which had not been treated according to the invention, it was noted the pearl pigment collected on the deflector periodically clumps or transferred to the panel being coated yielding mottling and defects.

Example 10

Example 7 was repeated except that an iron oxide-coated mica pigment was employed. Improvements in smoothness are noted.

Various changes and modifications can be made in the process and products of the present invention without departing from the spirit and scope thereof. The various embodiments which have been described herein were for the purpose illustrated in the invention were not intended to limit it.

What is claimed is:

1. In a method of electrostatically powder spray coating a substrate with a charged coating composition by spraying into proximity with an oppositely charged powder substrate, the improvement which comprises the powder coating composition comprising a mixture of a particulate resin carrier and particulate pigment in which the pigment is a laminar metal-containing pigment having a first coating thereon of hydrated aluminum oxide or a combination of hydrated cerium and aluminum oxides, and a coating of hydrolyzed silane coupling agent on or intermingled with the first coating as said coating composition.

2. A method according to claim 1 in which the silane coupling agent comprises a non-amino silane coupling agent.

3. A method according to claim 2 in which the non-amino silane coupling agent contains an alkoxy moiety.

4. A method according to claim 3 in which the pigment is a titanium dioxide coated-mica or an iron oxide-coated mica.

5. A method according to claim 1 in which the silane coupling agent is a trimethoxysilane coupling agent.

6. A method according to claim 1 in which said silane coupling agent is a combination of a non-amino silane coupling agent and an amino silane coupling agent.

7. A method according to claim 1 in which the silane coupling agent comprises an alkyl alkoxy silane.

8. A method according to claim 1 in which the pigment is a titanium dioxide coated-mica.

9. A method according to claim 1 in which the pigment is an iron oxide-coated mica.

* * * * *

UNITED STATES PATENT AND TRADEMARK OFFICE
CERTIFICATE OF CORRECTION

PATENT NO.    : 6,524,661 B2
DATED         : February 25, 2003
INVENTOR(S)   : Bagala et al.

It is certified that error appears in the above-identified patent and that said Letters Patent is hereby corrected as shown below:

Column 6,
Line 50, after "charged", insert -- powder --.
Line 51, delete "powder".

Signed and Sealed this

Seventh Day of February, 2006

JON W. DUDAS
*Director of the United States Patent and Trademark Office*